United States Patent
Zhu et al.

(10) Patent No.: US 11,710,027 B2
(45) Date of Patent: Jul. 25, 2023

(54) ARTIFICIAL INTELLIGENCE WORKFLOW BUILDER

(71) Applicant: International Business Machines Corporation, Armonk, NY (US)

(72) Inventors: Chao Zhu, Beijing (CN); Junsong Wang, Beijing (CN); Yubo Li, Beijing (CN); Hang Liu, Beijing (CN); Chang Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 530 days.

(21) Appl. No.: 16/807,896

(22) Filed: Mar. 3, 2020

(65) Prior Publication Data

US 2021/0279553 A1  Sep. 9, 2021

(51) Int. Cl.
*G06N 20/00* (2019.01)
*G06N 3/044* (2023.01)
*G06F 8/41* (2018.01)
*G06Q 10/10* (2023.01)
*G06N 3/082* (2023.01)

(52) U.S. Cl.
CPC ............ *G06N 3/044* (2023.01); *G06F 8/427* (2013.01); *G06N 3/082* (2013.01); *G06Q 10/103* (2013.01)

(58) Field of Classification Search
CPC ...... G06N 3/0445; G06N 3/082; G06F 8/427; G06Q 10/103
See application file for complete search history.

(56) References Cited

U.S. PATENT DOCUMENTS

| | | | |
|---|---|---|---|
| 2010/0125826 A1* | 5/2010 | Rice .................... | G06F 16/9535 717/107 |
| 2010/0211953 A1* | 8/2010 | Wakeling .............. | G06F 9/5038 714/48 |
| 2011/0131448 A1* | 6/2011 | Vasil ...................... | G06F 9/546 718/1 |
| 2011/0154305 A1* | 6/2011 | LeRoux ................... | G06F 8/71 717/140 |
| 2011/0225565 A1* | 9/2011 | van Velzen .......... | G06Q 10/067 705/348 |
| 2016/0358103 A1* | 12/2016 | Bowers ................. | G06F 9/4881 |
| 2017/0068521 A1* | 3/2017 | Bertran Monfort .... | G06F 9/543 |

(Continued)

OTHER PUBLICATIONS

Gil et al., "Artificial Intelligence and Grids: Workflow Planning and Beyond," Intelligent Systems, IEEE, Feb. 2004, 9 pages.

*Primary Examiner* — Hang Pan
(74) *Attorney, Agent, or Firm* — Patterson + Sheridan, LLP

(57) ABSTRACT

In some examples, a method includes receiving an artificial intelligence (AI) system scenario definition file from a user, parsing the definition file and building an application workflow graph for the AI system, and mapping the application workflow graph to an execution pipeline. In some examples, the method further includes automatically generating, from the workflow graph, application executable binary code implementing the AI system, and outputting the application executable binary code to the user. In some examples, the execution pipeline includes one or more building blocks, and the method then further includes collecting running performance of each of the building blocks of the execution pipeline in a runtime environment.

20 Claims, 10 Drawing Sheets

(56) References Cited

U.S. PATENT DOCUMENTS

2018/0089592 A1    3/2018  Zeiler et al.
2018/0089593 A1    3/2018  Patel et al.
2021/0232579 A1*   7/2021  Schechter ......... G06F 16/24573

* cited by examiner

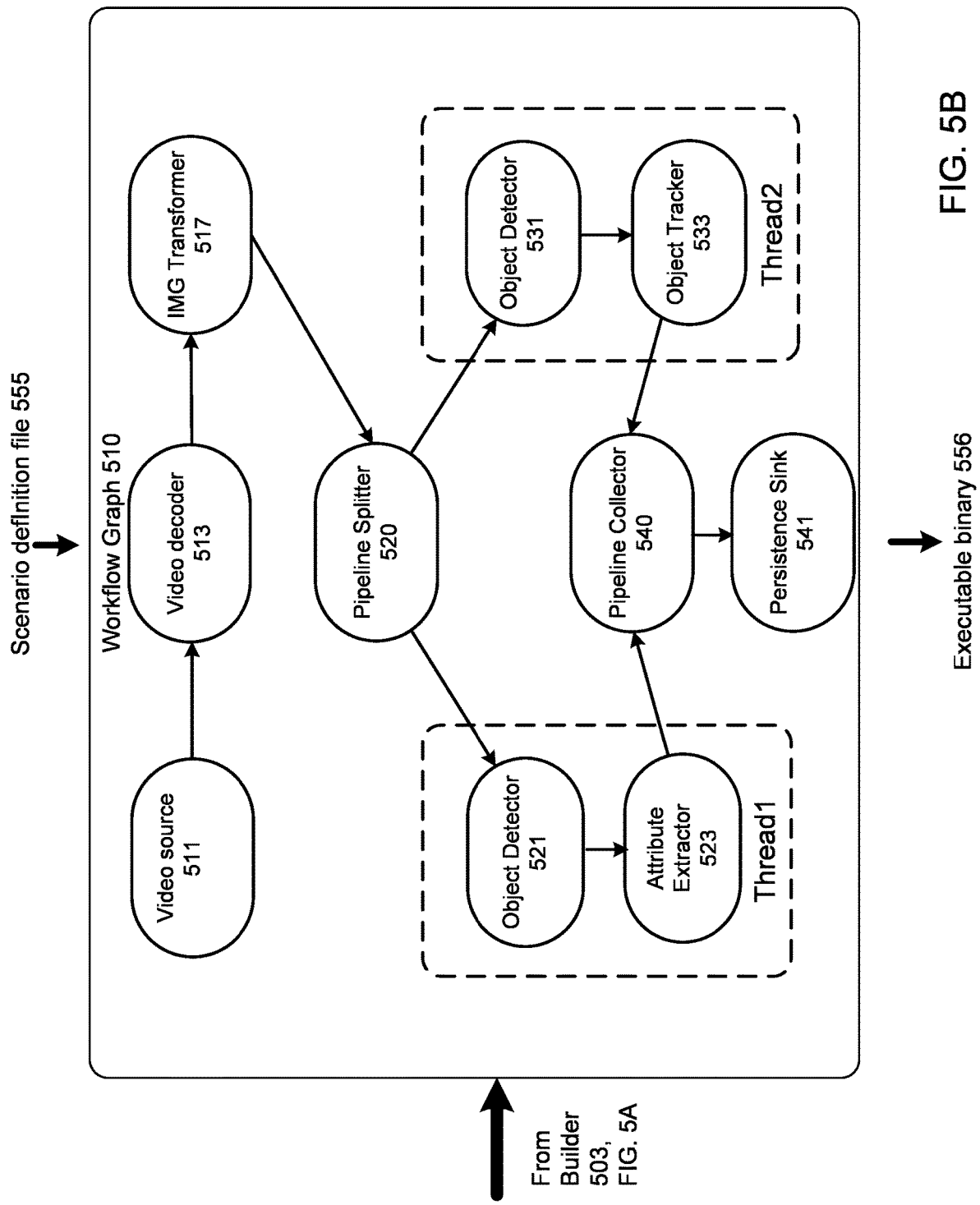

ARTIFICIAL INTELLIGENCE WORKFLOW BUILDER

BACKGROUND

The present invention relates to artificial intelligence (AI) systems, and more specifically to a system workflow builder for AI systems.

An AI system is a complex system that is not easy to build. In general, there many different use cases, and numerous various AI system components, in both hardware and software. These components may include, for example, sensors, accelerators, software drivers, libraries, deep learning frameworks, applications, and a communications infrastructure to facilitate communications between and among the various components. Moreover, an AI system is performance critical, and thus has strict requirements for processing latency, system capacity and scalability. Further, selection of AI algorithms is a significant technical barrier for most system designers.

One existing solution for AI system building is, for example, to use deep learning frameworks. However, such frameworks are designed solely for research prototypes, and, as a result, do not focus on performance. Moreover, such frameworks do not include an entire AI system implementation and thus only provide AI capability.

Another possible solution is to use an existing fixed AI streaming application structure, such as, for example, NVIDIA's Deepstream™ software development kit (SDK). However, such an SDK does not provide a performance optimization scheme for a real running environment. Moreover, such application structures are API based SDKs, and thus require additional development for system implementation. Finally, such application structures are generally designed for a single graphical processing unit (GPU) application.

Yet another possible solution is to simply manually design and develop a desired AI system from scratch. However, this approach may very likely turn out to be slow and complex.

Thus, it is useful to provide a system workflow builder for AI system that addresses these issues.

SUMMARY

According to one embodiment of the present disclosure, a method is provided. The method includes receiving an artificial intelligence (AI) system scenario definition file from a user, parsing the definition file and building an application workflow graph, and mapping the application workflow graph to an execution pipeline. In one embodiment, the method further includes automatically generating, from the workflow graph, application executable binary code implementing the AI system, and outputting the application executable binary code to the user.

In one embodiment, the execution pipeline includes one or more building blocks, and the method then further includes collecting running performance of each of the building blocks of the execution pipeline in a runtime environment. In one embodiment, the application workflow graph has a structure and one or more parameters, and the method further includes adjusting at least one of the structure or parameters of the workflow graph, based on the running performance of one or more of the building blocks of the execution pipeline, to generate a first revised workflow graph, and mapping the revised workflow graph to an execution pipeline.

According to a second embodiment of the present disclosure, a system is provided. The system includes a user interface configured to receive a user interface configured to receive a AI system scenario definition file from a user, and a definition parser, coupled to the user interface, configured to parse the definition file and build an application workflow graph for the AI system. In this embodiment, the system further includes a pipeline assembler coupled to the parser, configured to map the application workflow graph to an execution pipeline, automatically generate, from the workflow graph, executable binary code implementing the AI system, and output the executable binary code to the user.

According to a third embodiment of the present disclosure, a computer-readable storage medium is provided. The computer-readable storage medium has computer-readable program code embodied therewith, the computer-readable program code executable by one or more computer processors to perform an operation. The operation includes to receive an AI system scenario definition file from a user, parse the definition file and build an application workflow graph, and map the application workflow graph to an execution pipeline. In one embodiment, the operation further includes to automatically generate, from the workflow graph, application executable binary code implementing the AI system, and output the application executable binary code to the user.

BRIEF DESCRIPTION OF THE SEVERAL VIEWS OF THE DRAWINGS

FIG. 5B depicts a second portion of the example AI system workflow compiler, of FIG. 5A according to one embodiment disclosed herein.

DETAILED DESCRIPTION

Embodiments and examples described herein relate to automatically compiling a user defined AI system scenario into a high performance AI system application. In one or more embodiments disclosed herein, an optimized AI system architecture may be automatically profiled on a given hardware platform. In one or more embodiments, based on the profiling data, the user defined AI system scenario may be automatically compiled to a high performance AI system application. Thus, in such embodiments, as opposed to a user being required to develop the AI system, the user's requirements are automatically translated to a system implementation without user interaction. In such embodiments, a workflow is automatically optimized, and an optimal AI system implementation is automatically built for a specific running environment.

Thus, in one or more embodiments, the design of a complex AI system is made significantly easier.

The descriptions of the various embodiments of the present invention are presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

Figure 1:
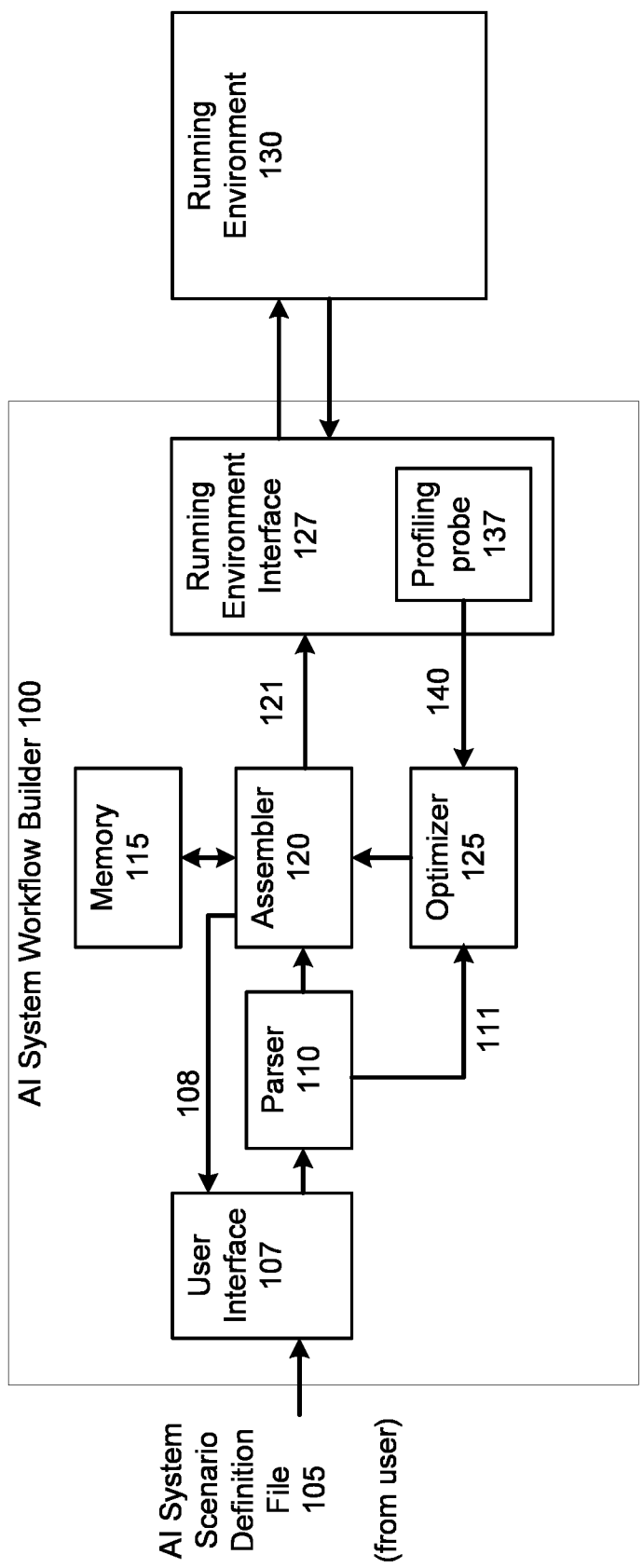
FIG. 1 illustrates a schematic drawing of an example system, according to one embodiment disclosed herein.

FIG. 1 illustrates a schematic drawing of an example system, according to one embodiment disclosed herein. As shown, the system is an AI system workflow builder 100 that interacts with a user and a runtime environment 130. The various elements shown within AI system workflow builder 100 in FIG. 1 perform certain processing steps as described below. What is generally not shown in FIG. 1 (with the exception of AI system scenario definition file 105) are the intermediate inputs to, and outputs from, each of these elements.

With reference to FIG. 1, there is shown a user interface 107 which is configured to receive an AI system scenario definition file 105. The AI system scenario definition file 105 provides user defined details and specifications for what the AI system that is to be automatically built is to do. For example, as described below with reference to FIG. 4, a scenario definition for an example video processing AI system, which is to be used as part of an advanced driver assistance system (ADAS), may include in the definition file 105, as examples, an input source, an output sink, an environment, a scenario type and a performance target.

In some embodiments the user may submit a scenario definition file 105, as is shown in FIG. 1. Alternatively, in other embodiments, user interface 107 may include an interactive graphical user interface (GUI) where the user may select from various presented options, and thus need not submit any specific file, and the AI system scenario definitions are then created out of the interactions between the user and the GUI of user interface 107.

Figure 4:
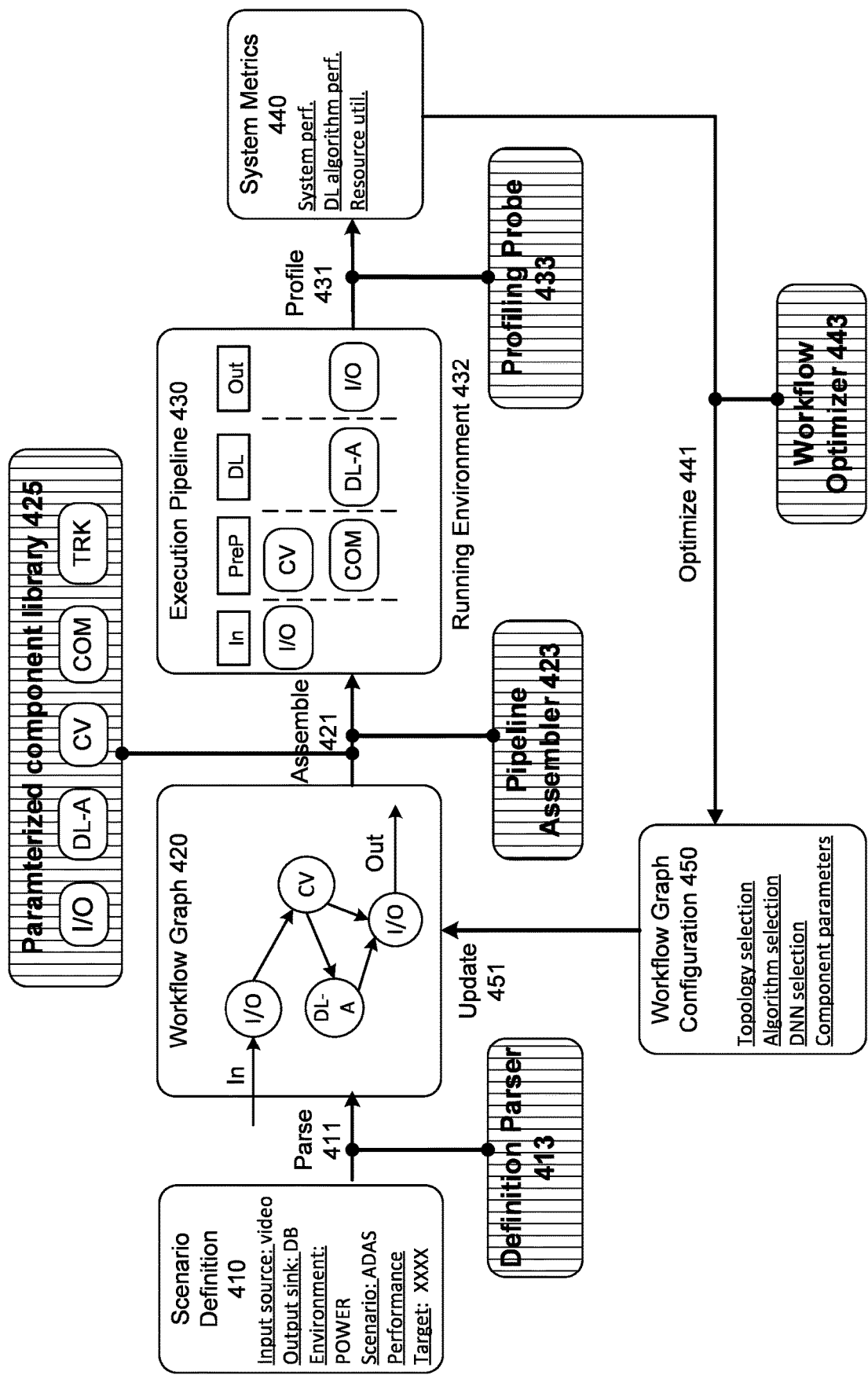
FIG. 4 illustrates an example workflow of an example AI system workflow builder, showing the various elements of FIG. 3 and their respective inputs and outputs, according to one embodiment disclosed herein.

Continuing with reference to FIG. 1, the user interface 107 is coupled to parser 110, to which it provides the AI system scenario definition file 105. In one embodiment, parser 110 parses the definition file 105, and builds from it an application workflow graph for the desired AI system scenario. A workflow graph is a symbolic representation of a process, indicating the steps involved in the process, and what entity is to perform each process. An example of a workflow graph is shown in FIG. 4, and described in detail below. In one embodiment, parser 110 is further configured to identify a performance target for the AI system scenario from the AI system scenario definition file 105. One example of such a performance target is shown at performance target 671 of FIG. 6A, described below. Parser 110 is also coupled to optimizer 125, over communications link 115 as shown, and it is over this link 115 that, for example, parser 110 forwards the identified performance target to optimizer 125. Optimizer 125, and its use of the performance target generated by parser 110, are both described more fully below.

Continuing further with reference to FIG. 1, parser 110 passes the application workflow graph to assembler 120, to which parser 110 is coupled. Assembler 110, as its name indicates, creates binary executable code. Thus, assembler 120 takes the application workflow graph built by parser 100 and maps it to an execution pipeline that may be executed in a running environment to which the example system is connected, such as, for example, running environment 103 shown in FIG. 1. It is here noted that, from an implementation point of view, in one or more embodiments, assembler 120 may, for example, generate top level code using an underlying template or library, and may then use a compiler, such as, for example, GCC, to generate a binary file for execution in running environment 130 The execution pipeline created by assembler 120 may contain several building blocks, which assembler 120 may, in one embodiment, obtain from a component library, as described more fully below with reference to FIGS. 3 and 4. In one embodiment, one or more component libraries may be stored in memory 115, to which assembler 120 is coupled, as shown. It is noted that in the example of FIG. 1, running environment 130 is not actually part of AI system workflow builder 100. As a result, AI system workflow builder 100 also has a running environment interface 127, through which binary executable code is passed from assembler 120, over link 121. In addition, running environment interface 127 also includes profiling probe 137, which receives data regarding performance of the execution pipeline on running environment 130. In one embodiment, profiling probe 137 continuously collects the running performance and statistics of each building block of the execution pipeline as it runs on the running environment 130, and provides that data to optimizer 125, next described, over communications link 140, as shown in FIG. 1. Prior to describing the operations of optimizer 125 however, it is noted that in the example of FIG. 1, communications links between AI system workflow builder 100 and running environment 130 may be across a data network. In one embodiment, the two entities need not be co-locational, and one or both may be provided in the cloud, remotely connected one to the other through a data communications network. For example, a target running environment 130 may be an embedded system, and the generation and optimization of the AI system, by for example, parser 110, assembler 120 and optimizer 125, may be performed in the cloud, and the running environment 130 may be any remote device. In alternate embodiments, for example, running environment 130 may be part of, and integrated within AI system workflow builder 100.

Continuing further with reference to FIG. 1, it is the task of optimizer 125 to iteratively modify the structure or parameters of the workflow graph originally created by parser 110, so as to improve the performance of an example execution pipeline to which the workflow graph is mapped to by assembler 120. Optimizer 125 does this based on the profiling data it receives from profiling probe 137, which, as noted, is gathered continuously as the execution pipeline is run on running environment 130. In one embodiment, a workflow graph is iteratively optimized by optimizer 125, then remapped by assembler 120, as optimized, to a revised execution pipeline, which is then passed, through runtime environment interface 127, to running environment 130. The iterative optimizations end once the last iteration of the optimized workflow graph, as executed, meets the performance target of the AI system scenario definition file 105. When that occurs, the assembler 120 forwards the binary executable code embodying the final optimized execution pipeline to user interface 107, across link 108, as shown.

Figure 2:
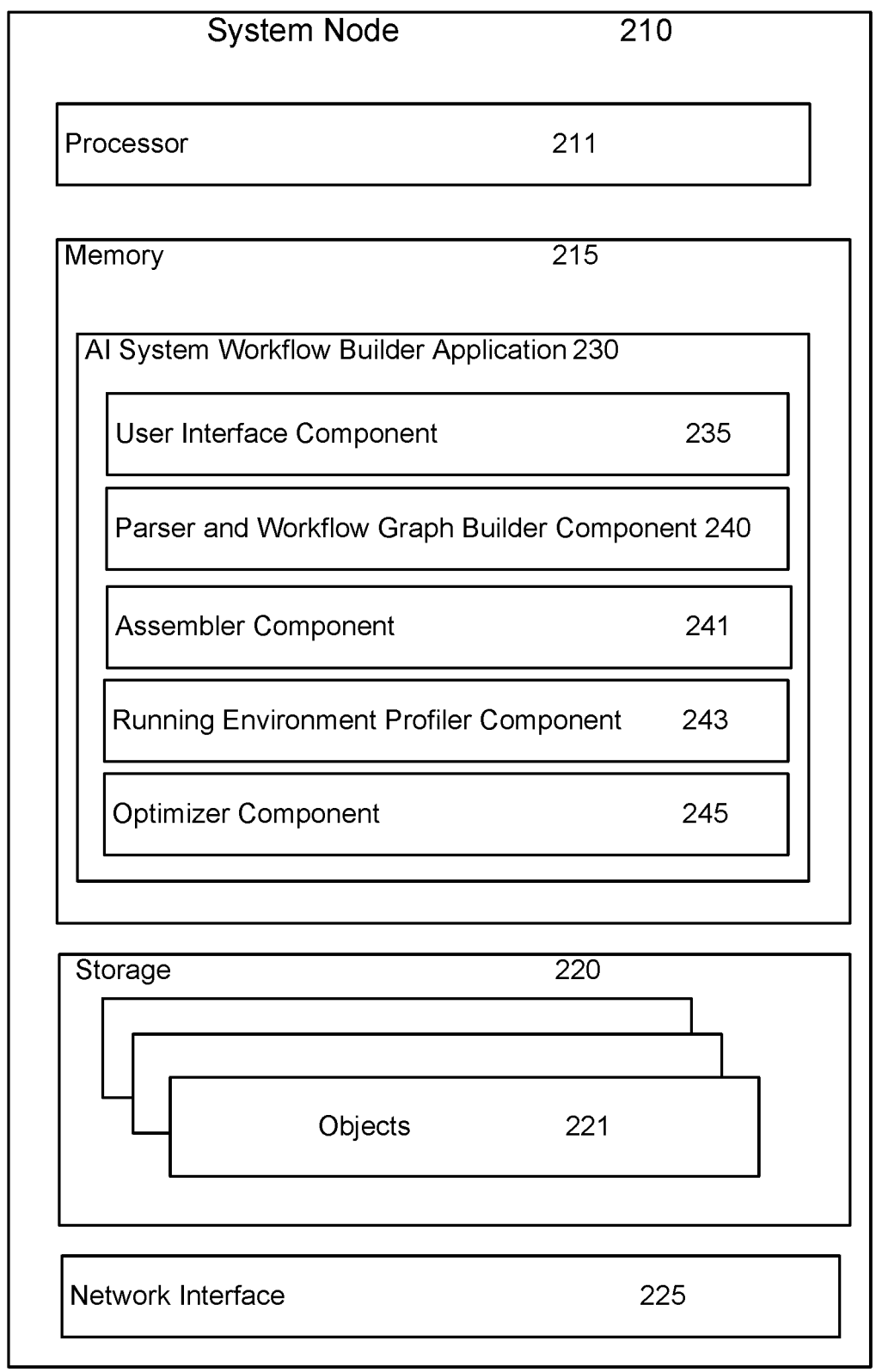
FIG. 2 is a block diagram illustrating a system node configured to provide cognitive multi-task orchestration of dialogues, according to one embodiment disclosed herein.

FIG. 2 is a block diagram illustrating a System Node 210 configured to provide AI system workflow building from a user's AI system scenario definition file, according to one embodiment disclosed herein. System Node 210 is equivalent to the example system 100 schematically depicted in FIG. 1, but, for ease of illustration, without showing, in FIG. 2, all of the various internal (or external) communications pathways that are shown in FIG. 1. In the illustrated embodiment, the system node 210 includes a processor 210, memory 215, storage 220, and a network interface 225. In the illustrated embodiment, the processor 210 retrieves and executes programming instructions stored in memory 215, as well as stores and retrieves application data residing in storage 220. The processor 210 is generally representative of a single CPU, multiple CPUs, a single CPU having multiple processing cores, and the like. The memory 215 is generally included to be representative of a random access memory. Storage 220 may be disk drives or flash-based storage devices, and may include fixed and/or removable storage devices, such as fixed disk drives, removable memory cards, or optical storage, network attached storage (NAS), or storage area network (SAN). Storage 220 may include one or more data bases, including IASPs. Via the network interface 225, the system node 210 can be communicatively coupled with one or more other devices and components, such as other system nodes 210, monitoring nodes, storage nodes, and the like.

In the illustrated embodiment, storage 220 includes a set of objects 221. Although depicted as residing in storage 220, in embodiments, the objects 221 may reside in any suitable location. In embodiments, the Objects 221 are generally representative of any data (e.g., application data, saved files, databases, and the like) that is maintained and/or operated on by the system node 210. Objects 221 may include one or more component libraries, or parameterized component libraries containing functions, processes, or other standard operations that may be used as building blocks by an assembler component 241 when mapping a workflow graph generated by a parser component 240 to an execution pipeline.

Objects 221 may also include AI system scenario definition files, as received from users, according to some embodiments described herein. Objects 221 may still further include executable binary code and final versions of executable binary code that is generated by assembler component 241, as well as profiling statistics obtained by an optimizer component 245 from a running environment, as described more fully below. As illustrated, the memory 215 includes an AI system workflow builder application 230. Although depicted as software in memory 215, in embodiments, the functionality of the AI system workflow builder application 230 may be implemented in any location using hardware, software, firmware, or a combination of hardware, software and firmware. Although not illustrated, the memory 215 may include any number of other applications used to create and modify the objects 221 and perform system tasks on the system node 210.

As illustrated, the AI system workflow builder application 230 includes a user interface (UI) component 235, a parser and workflow graph builder component 240, an assembler component 241, a running environment profiler component 243, and an optimizer component 245. In one embodiment, the profiler component may be part of the system node 210, as shown in the example of FIG. 2, when the running environment is external to the system node. In another embodiment, the running environment is integrated with in the system node 210, and thus the running environment profiler component may be integrated within the running environment itself.

Although depicted as discrete components for conceptual clarity, in embodiments, the operations and functionality of the UI component 235, the a parser and workflow graph builder component 240, the assembler component 241, the running environment profiler component 243, and the optimizer component 245, if implemented in the system node 210, may be combined, wholly or partially, or distributed across any number of components or sub-components. In an embodiment, the AI system workflow builder application 230 is generally used to generate an optimized AI system executable binary from a user defined scenario file for a specified running environment.

In an embodiment, the UI component 235 is used to provide user interfaces to communicate with users or client devices, so as to receive AI system scenario definition files, so as to, after several processing tasks, generate optimized AI system executable binary code. The resultant optimized AI system executable binary code implements the AI system on a specified running environment. Thus, in one embodiment, the user may, in the AI system scenario definition file, specify a running environment that the AI system is to be executed on. In other embodiments, for example, such as in a cloud scenario, where the end user does not responsibility for the running environment, the service provider may handle all of the hardware issues, and there may a default cloud based running environment. However, in embodiments where the end-user has a special requirement, and will thus handle the hardware, then the running environment should be specified by the user in the AI system scenario definition file. In some embodiments, the UI component 235 is an API that is automatically accessed by a client application to submit AI system scenario definition files directly from user devices, and, in return, receive the binary executable code implementing the optimized AI system. Thus, for example, a user or user entity that needs to have several AI systems created for it may have a graphical environment in which it may specify various AI systems having various possible attributes. The attributes may, for example, map nicely onto the components used by the assembler component of system node 210, making the assembler's job easier, and more efficient. Alternatively, in other embodiments, UI component 235 may be a graphic user interface (GUI), through which the user actually specifies the information it would otherwise provide in an AI system scenario definition file, and thus, in such other embodiments, the user need not provide any separate AI system scenario definition file at all, it being created through his or her interaction with the GUI component.

In the illustrated embodiment, the parser and workflow graph builder component 240, after receiving the definition file, builds an application workflow graph for the specified AI system. Following that, in the illustrated embodiment, the assembler component 241, after receiving the application workflow graph for the specified AI system, maps the application workflow graph to an execution pipeline for a specified running environment. In one embodiment, the execution pipeline includes several building blocks, as described in detail below with reference to the example used in each of FIGS. 4, 5A and 5B, and 6A, 6B and 6C. In one embodiment the AI system scenario definition file specifies a running environment for the AI system to be built.

In the illustrated embodiment, the running environment profiler component 243 continuously collects the running performance and statistics of each building block on the execution pipeline, and, based on the profiling results, the optimizer component 245 adjusts the structure or parameters of the workflow graph, and provides the optimized workflow graph to the assembler component 241 for it to remap the now optimized workflow graph to a revised execution pipeline. In one embodiment, there is an iterative process in which the optimizer component 245 further adjusts the structure or parameters of the workflow graph, and the assembler component 241 further remaps the new iteration of the optimized workflow graph to a revised execution pipeline, and the running environment profiler component 243 collects the running performance and statistics of each building block on the new iteration of the execution pipeline. In one embodiment, this iterative process continues until a performance target set for the AI system has been met, for example, as set in the user's original AI system scenario definition file. When this occurs, the assembler component 241 generates final application executable binary, and the UI component provides it to the user.

In embodiments, System Node 210 may communicate with both users, clients and cloud servers, in which cloud based reference images databases, as well as test images are stored, via Network Interface 225.

Figure 3:
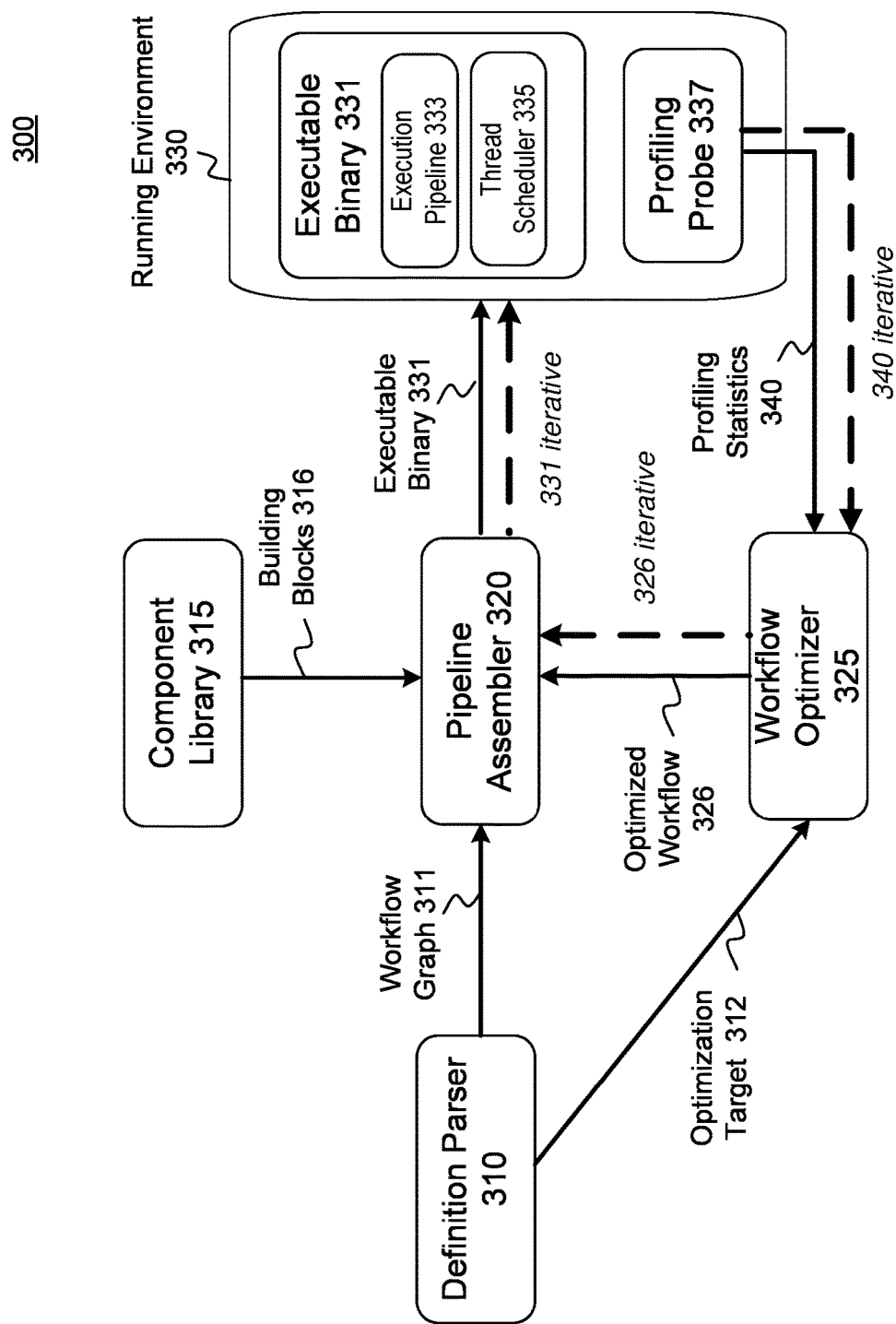
FIG. 3 illustrates an example system architecture according to one embodiment disclosed herein.

FIG. 3 illustrates an example system architecture 300 according to one embodiment disclosed herein. The example system architecture is similar to the elements of example AI system workflow builder 100 of FIG. 1 (without the user interface), with the additional details of the intermediate inputs being shown, as well as the details of an example running environment. Moreover, the names of the various processing elements of the architecture are more detailed, and thus, for ease of description, the final two digits of each processing element of FIG. 3 is identical to the final two digits of its corresponding processing element of the example AI system workflow builder 100 of FIG. 1. Thus, in the following description of FIG. 3, only aspects of the example architecture not already described with reference to FIG. 1 are detailed.

With reference to FIG. 3, it is assumed that definition parser 210 has received an AI system scenario definition file from a user. In response, definition parser 210 generates workflow graph 211 and provides it to pipeline assembler 320, and communicates optimization target 312 to workflow optimizer 325. Pipeline assembler 320, upon receipt of the workflow graph 311, accesses component library 315 and uses one or more of the building blocks 316 that are provided there to generate executable binary code 331. For clarity, it is here noted that, in the description above with reference to FIG. 1, it was stated the assembler 120 maps the application workflow graph to an execution pipeline that may be executed in a running environment to which the example system is connected, and as illustrated in FIG. 3, the assembler 320 is shown as generating executable binary 331. Both descriptions are accurate, as, in one or more embodiments, from a logic point of view the workflow is mapped to the execution pipeline, but from the code implementation point of view, the pipeline is implemented with lines of code, and assembler uses a compiler to generate the executable binary file 331.

Continuing with reference to FIG. 3, running environment 330 receives the executable binary code 331, and runs it. As shown in detail in running environment 330, executable binary 331 includes both execution pipeline 333 and thread scheduler 335. As a result of executable binary 331 being run on running environment 330, profiling statistics 340 are acquired by profiling probe 337. As noted above, in one embodiment profiling probe 337 continuously collects the running performance and statistics of each building block on the execution pipeline of executable binary 331.

Continuing with reference to FIG. 3, profiling statistics 340 are provided by profiling probe 337 to workflow optimizer 325, which modifies workflow graph 311 into optimized workflow 326. This latter optimized workflow 326 is provided by workflow optimizer 325 to pipeline assembler 320, and an optimized version of executable binary 331 generated and run. In one embodiment, as described above, there is an iterative process between profiling probe 237, workflow optimizer 235, pipeline assembler 320 and running environment 330, whereby the executable binary code is optimized several times until a final version is obtained. This process is illustrated in FIG. 3 by dashed lines "340 iterative", "326 iterative" and "331 iterative", respectively connecting profiling probe 337 to workflow optimizer 325, workflow optimizer 325 to pipeline assembler 320, and pipeline assembler 320 to running environment 330, as shown.

FIG. 4 illustrates an example workflow of an example AI system workflow builder, showing the various processing blocks of FIG. 3 and their respective inputs and outputs, according to one embodiment disclosed herein. In FIG. 4, the various processing elements shown in FIG. 3 are shaded, as is the newly presented parameterized component library. The non-shaded blocks shown in FIG. 4 show details of the respective inputs and outputs to the respective processing blocks.

FIG. 4 thus provides additional illustrative detail to the example inputs and outputs, over and above that provided in FIG. 3, as well as illustrating building blocks as obtained by an example assembler from an example parameterized component library. It is noted that what allows the example workflow of FIG. 4 to provide these additional details is that it is not generic. Rather, the example of FIG. 4 is directed to a particular use case—that of a video processing system for use in an automated driver assistance system (ADAS). An ADAS is a vehicular AI system that takes some tasks normally performed by a driver of the vehicle, and offloads them to an on-board processor of the vehicle, for example. In some embodiments, the ADAS only takes over when an urgent safety condition occurs, for example where the driver has not noticed a dangerous condition, and has thus failed to take necessary action, such as, for example, stopping to avoid hitting another vehicle or a pedestrian. In other embodiments, an ADAS may perform additional routine tasks, besides acting as a safety fail-safe mode.

Thus, with reference to FIG. 4, a user provides an example scenario definition 410. As shown, such a scenario definition may include an input source, an output sink, an environment, a scenario and a performance target for the example AI system. In the specific example shown in FIG. 4, the AI system desired is a video processing system. Thus, the input source is video, and the output sink, where the processed video is ultimately stored, is a database. As also shown in scenario definition 410, the environment in which the AI system operates is listed as "power." The environment here refers to the running environment, which may be, for example, (as here) IBM™ POWER, an X86 machine, an ARM™ processor(s), or the like. Finally, as shown in scenario definition 410, the scenario is an ADAS, as noted above. Finally, scenario definition 410 includes a certain performance target. As noted above, in one embodiment, this performance target is used by workflow optimizer 443 to determine when to stop iterative optimizations of the workflow graph 420, and to finalize the binary executable for the user requested AI system.

Continuing with reference to FIG. 4, as shown at 411, definition parser 413 parses scenario definition 410 to generate workflow graph 420. Workflow graph 420 sets out the processing steps needed, and their respective sequencing, to implement the scenario definition 410. Thus, workflow graph 420 has an input, which is performed by a first I/O process (I/O). From the I/O process workflow proceeds to a computer vision process (CV), whose output is fed, in parallel, to a deep learning process (DL-A) and a second I/O process, and output process. The second I/O output process also receives the output of the DL-A process, and provides the ultimate output of the workflow. Workflow graph 420, once created by definition parser 413, is then input to pipeline assembler 423, which, as indicated at 421, assembles the workflow graph 420 to an execution pipeline 430 that is run on running environment 432. In the example of FIG. 4, the processes or building blocks used in the execution pipeline are obtained from a pre-existing library, namely parametrized component library 425. This library has a set of pre-defined software modules for functions that correspond to processes specified by workflow graph 420, which pipeline assembler may combine together in an execution pipeline to implement the workflow graph 420. As shown, the example parameterized component library has five example processes. These include the three shown in the workflow graph, as well as a communications (COM) process, and a tracker (TRK) process (used to track objects through a video sequence).

As shown, execution pipeline 430, drawing on the building blocks provided in parametrized component library 425, maps the various processes of workflow graph 420 to four parallel processing categories, to be executed in two sequential steps. As shown, the four categories are "input (In)", "preprocessing (PreP)", "deep learning (DL)" and "output (Out)." In the first step the input process (I/O) and the computer vision process are executed in parallel. In the second step, another preprocessing process "communications (COM)", not shown in the workflow graph the deep learning process DL-A, and the output process I/O, are all executed, completing the example execution pipeline. The reason that the COM process is not included in the workflow graph is that a user is generally not concerned with it. However, at the implementation level, where, for example, the two components are running in distributed environment, a COM component should be included, as it will improve latency and communication cost.

As described above, while the execution pipeline 430 is running on running environment 432, as shown at 431, profiling probe 433 profiles the performance of the execution pipeline by continuously gathering running performance and statistics of each of the building blocks of the execution pipeline. This profiling data is indicated in FIG. 4 as system metrics 440, which, in the depicted example includes system performance, deep learning algorithm (e.g., DL-A) performance, and resource utilization. In the depicted example, workflow optimizer 443 receives the system metrics data, and, as shown at 441, uses this data to optimize the workflow graph 420, by generating an updated version of it, as shown at 451. In optimizing the workflow graph and generating the updated version of it, workflow optimizer 443 adjusts the workflow graph's configuration 450. As shown, this may include one or more of optimization of topology of the workflow graph, algorithm optimization, deep neural network (DNN) selection, or component parameters optimization. Two examples of such optimizations are described in detail below, with reference to FIGS. 6B and 6C. Following the optimization of the workflow graph, as described above, the workflow graph and execution pipeline are iteratively optimized until an execution pipeline is obtained that meets the performance target specified in scenario definition 410.

Figure 5A:
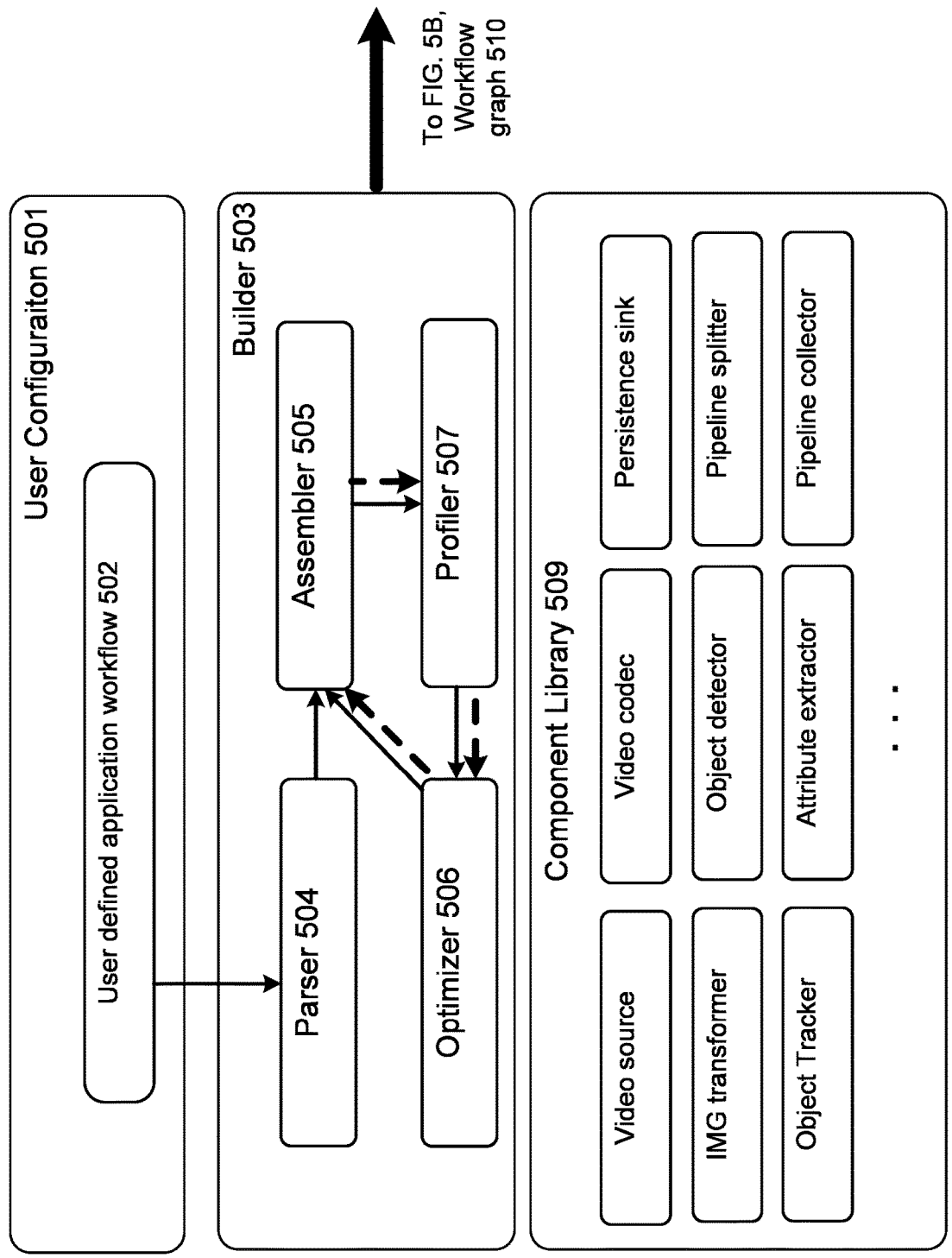
FIG. 5A depicts a first portion of an example AI system workflow compiler, according to one embodiment disclosed herein.

FIGS. 5A, 5B and 6A, 6B and 6C all refer to the same example AI system specified by a user, to be built in accordance with one or more embodiments of this disclosure, as is illustrated in FIG. 4. The example AI system is, as noted above, a video processing system that uses AI to both identify objects and track them, as part of an ADAS system. FIGS. 5A and 5B, next described, illustrate an example AI system workflow compiler FIGS. 5A and 5B together depict an example AI system workflow compiler, according to one embodiment disclosed herein. FIG. 5A depicts an example builder 503, which is similar to the example system of FIG. 1, as well as the example architecture of FIG. 3, and the workflow illustrated in FIG. 5, all as described above. As shown in FIG. 5A, there is a user configuration block 501 that includes a user defined application workflow 502. The user defined application workflow 502 may be provided in the form of an AI system scenario definition file 105, for example, as described above with reference to FIG. 1. The user defined application workflow 502 is provided to builder 503, which includes, as described above, parser 504, assembler 505, profiler 507 and optimizer 506. As described above, assembler 505, profiler 507 and optimizer 506 may generate several iterations of a workflow graph, and this repeated iteration is illustrated, as was the case in FIG. 3, by the second set of dashed arrows respectively connecting assembler 505, profiler 507 and optimizer 506.

Continuing with reference to FIG. 5A, it is noteworthy that builder 530, in generating an application workflow graph, accesses component library 509. Component library 509 depicts nine example processes, which may be used in a video processing AI system, such as is illustrated in each of FIGS. 5B and 6A, 6B and 6C. Thus, component library 509 is similar to, but provides a more detailed example of, a video processing application component library such as parameterized component library 425 of FIG. 4. With reference to component library 509 of FIG. 5A, there are pre-defined software routines available for video source, video codec, image (IMG) transformer, object detector, attribute extractor, object tracker, pipeline splitter, pipeline collector, and persistence sink. These components are all used in the example workflow graph of FIG. 5B, next described.

FIG. 5B depicts a second portion of the example AI system workflow compiler of FIG. 5A according to one embodiment disclosed herein. FIG. 5B depicts a completed workflow graph 510, generated from an original scenario definition file 555, by builder 503 of FIG. 5A, described above. With reference to workflow graph 510, as noted, each of the components of component library 509 of FIG. 5A are used at least once. Thus, the components or processes of workflow graph 510 begin at the top left of workflow graph 510, with video source 510. As noted with reference to scenario definition 410 of FIG. 4, the input source for the example AI system specified by scenario definition 410 is video. Thus, in the detailed workflow graph 510, the input data comes from video source 511, which is input to video decoder 513 so that it may be viewed by an example AI system. The input video is next operated on by image transformer 517, which processes images of the input video so that objects within the video may be detected, tracked and their attributes extracted.

Continuing with reference to FIG. 5B, from image transformer 517 workflow graph 510 proceeds to pipeline splitter 520. This process allows the workflow graph 510 to separate into two threads and execute them in parallel, thus saving time (reducing latency). Thus, pipeline splitter 520 separates the processing into Thread1 and Thread2, as shown. Beginning with Thread1 on the left side of FIG. 5B, there is an object detector 521, which detects objects in the video images, and once detected, their attributes are extracted with attribute extractor 523, which thus ends Thread1. Thread2, on the right side of the figure, begins with a second object detector process, object detector 531. It is noted that the two separate object detector processes are needed in workflow graph 520 so that they may both operate in parallel. From, object detector 531, Thread2 continues to object tracker 533, which tracks an object through several frames of the input video being processed. Thread2 ends with object tracker 533. The processing at each of the two threads then reconnects into a single processing stream, and thus workflow from each of Thread1 and Thread 2 are joined at pipeline collector 540 which merges outputs of multiple threads together, as shown. After the two threads are merged, the output is passed to persistence sink 541 for storage. According to the scenario definition 410 of FIG. 4 for this example AI system, the output sink is a database. The workflow shown in workflow graph is, as shown at the bottom of FIG. 5B, used to generate an executable binary file 556 implementing the example AI system.

Figure 6A:
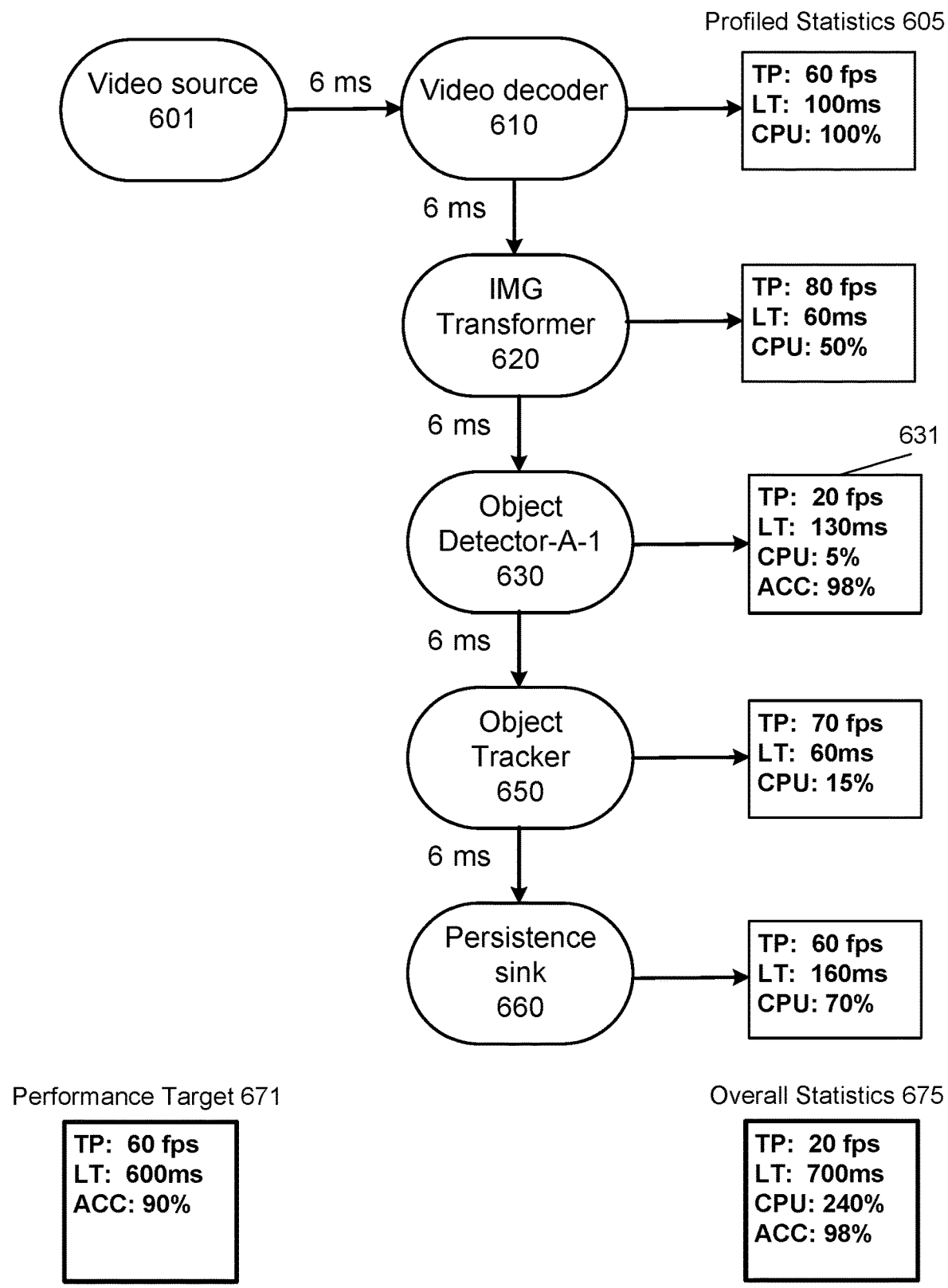
FIG. 6A depicts an example workflow graph for an AI system, according to one embodiment disclosed herein.
Figure 6B:
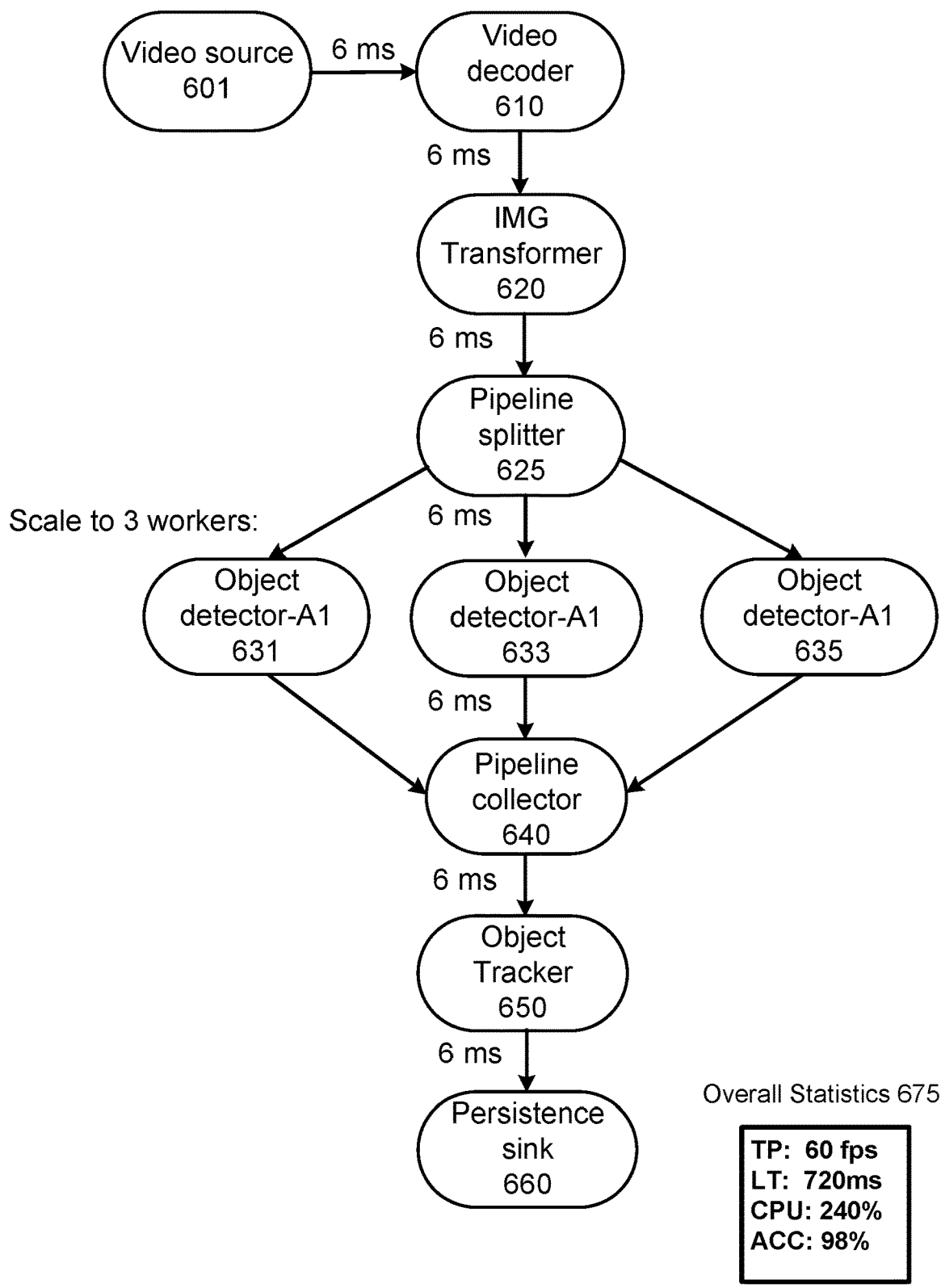
FIG. 6B depicts the example workflow graph of FIG. 6A after a first optimization, directed to topology, according to one embodiment disclosed herein.
Figure 6C:
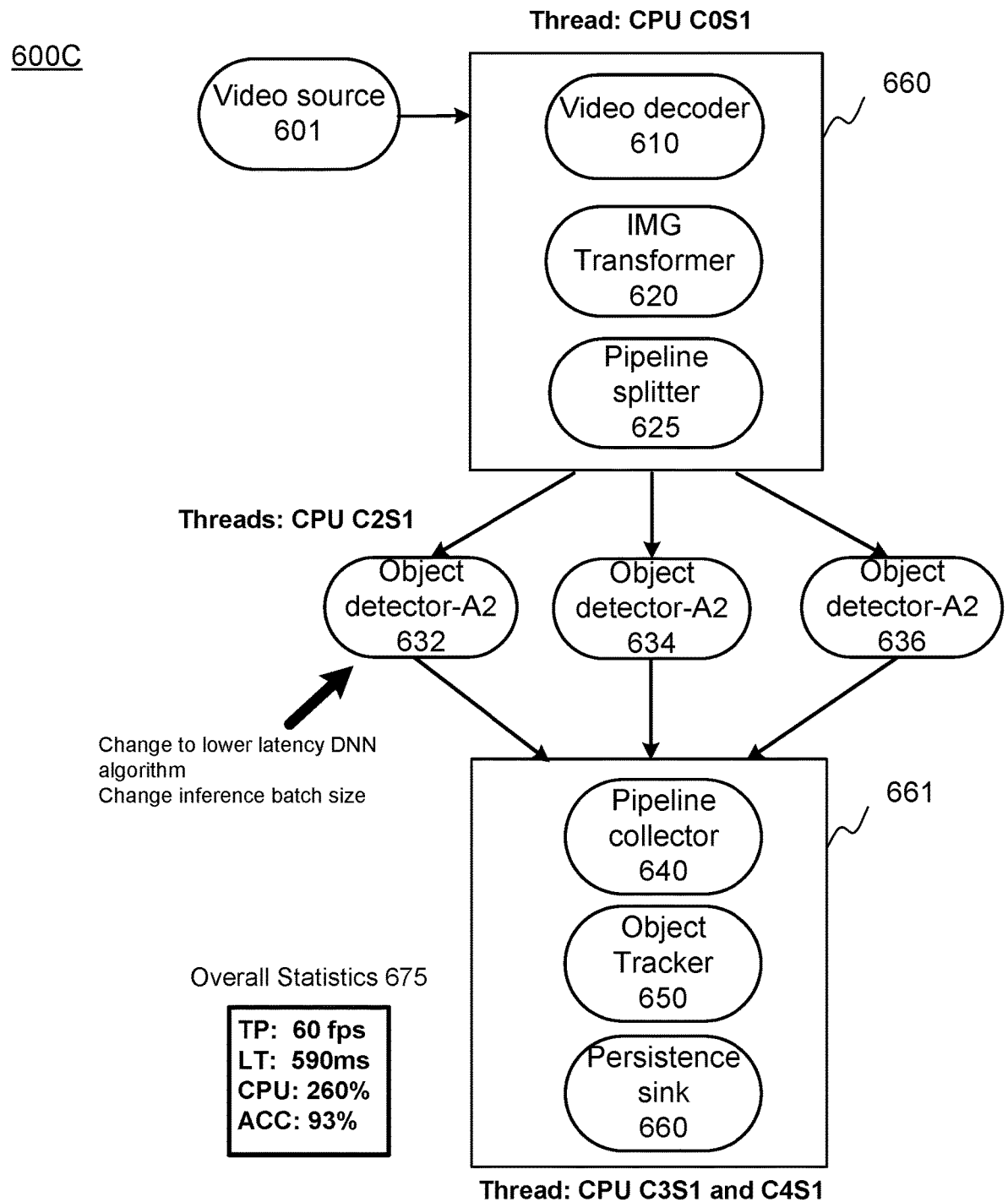
FIG. 6C depicts the example workflow graph of FIG. 6B, after a second optimization, directed to algorithms and parameters, according to one embodiment disclosed herein.

As described above with reference to the example AI system builder architecture of FIG. 3, there is an iterative process between profiling probe 337, workflow optimizer 325, pipeline assembler 320 and running environment 330, whereby the executable binary code is optimized several times until a final version is obtained. This process is illustrated in FIG. 3 by dashed lines "340 iterative", "326 iterative" and "331 iterative", respectively connecting profiling probe 337 to workflow optimizer 325, workflow optimizer 325 to pipeline assembler 320, and pipeline assembler 320 to running environment 330, as shown. FIGS. 6A through 6C, next described, illustrate an example of this iterative process, with a first generated workflow graph, followed by two sequential optimization iterations. Thus, FIG. 6A illustrates a first version of an example video processing AI system workflow graph, FIG. 6B illustrates a first iteration of an optimization of the workflow graph of FIG. 6A, and FIG. 6C a second optimization iteration.

With reference to FIG. 6A, an example workflow graph 600A for an AI system is depicted, according to one embodiment disclosed herein. There is a video source 610 that provides the input to the processing illustrated in the workflow graph. Following the input processing at 601, there are five processing components, or modules, each of which has a defined latency. Additionally, moving from each module to the next has a latency of 6 milliseconds (ms) to complete. For each module there is provided profiled statistics 605 are provided in a box to the right of each of the processing components 610 through 660 (there is no component 640). The profiled statistics include throughput (TP), latency (LT), CPU utilization (CPU) and accuracy (ACC) of the function or task performed by the module. The processing in this example is very similar to that illustrated in FIG. 5B, with the exception that there is no attribute extraction process used. in the workflow graph 600A. In particular, there is a video decoder component 610, an IMG transformer component 620, a single object detector component "Object detector-A-1" 630, a single object tracker component 650 and, finally, a persistence sink component 660.

Continuing with reference to FIG. 6A, shown at the bottom left of FIG. 6A is a performance target 671, which may be specified in the original AI system scenario definition file for this example AI system, and, at the bottom right of the figure, actual overall statistics 675 for the workflow graph, which refer to actual execution data for binary executable code generated from the workflow graph 600A that was run in a running environment, in the manner described above. By comparing the overall statistics 675 with the targeted performance 671, it is seen that the specified target throughput (abbreviated as "TP" in the figures) of 60 frames per second (fps) was not met by the actual running environment statistics 675, which show an fps of only 20 fps. Moreover, the specified latency ("LT") of 600 ms was also not met, as the actual running environment statistics 675 show a latency of 700 ms, 100 ms too slow. Although the actual accuracy (of object detection, as shown for object detector 630, at profiled statistics 631) is 98%, this exceeds the specified accuracy of only 90%. Thus, because the workflow graph 600A does not yet meet the specified performance target, further iterations are needed prior to finalizing the binary executable code for this example AI system. From inspection of workflow graph 600A, it is clear that the bottleneck is the component object detector-A-1 630, which only operates at 20 fps. This causes the entire workflow graph processing to operate at an fps of 20, far below the performance target of 60 fps. If this can be remedied, the throughput can be increased. Thus, some images will be blocked in this module 630 and have to wait. Because module 630 operates at only 20 fps compared to the 60 fps targeted performance (which is met or exceeded by each of the other modules), module 630 may increase its latency threefold, to as much as 390 ms. This is what contributes, in larger part, to the overall latency of 700 ms, as shown in overall statistics 675. It is noted that the "A-1" in—object detector-A-1 630 refers to a specific type of object detector component or software routine, and there may also be alternate object detector components available in an example associated component library.

FIG. 6B depicts a first optimized version 600B of the example workflow graph of FIG. 6A after a first optimization directed to topology has been performed, according to one embodiment disclosed herein. The optimized With reference to FIG. 6B, in order to meet the performance target of a throughput 60 fps, the slowest component, namely object detector-A-1 was scaled up to have three versions of this component processing in parallel. This first optimization is thus a topology optimization. With reference to FIG. 6B, now there are three object detector-A-1 components, namely 631, 633 and 635, in place of only one such component 630 in FIG. 6A. Additionally, because this topological change requires splitting the processing after component 620 into three parallel streams, and then rejoining the three streams prior to the object tracker component 650, in first optimized version of workflow graph 600B two additional components are needed, namely pipeline splitter 625, which facilitates the three streams for object detector-A-1 components, and pipeline collector 640, which facilitates rejoining the three streams after the processing at components 631, 633 and 635. It is noted that each of these pipeline management components increases the latency by 6 ms, plus the latency inherent in each of the components 625 and 640.

Thus, with reference to overall statistics 675 in FIG. 6B, first optimized version 600B of the example workflow graph of FIG. 6A now has the desired throughput of 60 fps, but still has too high a latency. In fact the latency has increased from 700 ms to 720 ms relative to the workflow graph 600A of FIG. 6A. As a result, a second optimization iteration is needed. This is shown in FIG. 6C.

FIG. 6C depicts a second optimization iteration 600C of the example workflow graph of FIG. 6A, after a second optimization has been performed, now directed to algorithms and parameters, according to one embodiment disclosed herein. With reference to FIG. 6C, as a first optimization, the first three components and the last three components have each been respectively consolidated into a single thread. Thus, components 610, 620 and 625 are joined into the thread "CPU C0S1" 660, and components 640, 650 and 665 are joined into the thread "CPU C3S1 and C4S1" 661. It is noted that in this example, the thread nomenclature identifies a core number and a socket number, such that Thread C0S1 refers to Core 0 Socket 1, etc. As further shown, the three threads processing object detector components 632, 634 and 636 (as now changed from FIG. 6B) in parallel is thread CPU C2S1.

Moreover, as a second optimization, the component used for the object detector process has been changed, from object detector-A-1 to now use the process object detector-A-2. As shown in FIG. 6C, this component uses a lower latency DNN algorithm, as well as a different inference batch size. As a result of the changes made in the second optimization, the overall latency of the second optimized workflow graph 600C is now 590 ms, and the accuracy of the new object detector component is 93%, all as shown in overall statistics 675. These running environment statistics beat the performance target 671, shown in FIG. 6A, and thus there is no further need for additional optimizations. As a result second optimized workflow graph 600C is used to generate executable binary, and the process of creating the desired AI system workflow is now complete.

Figure 7:
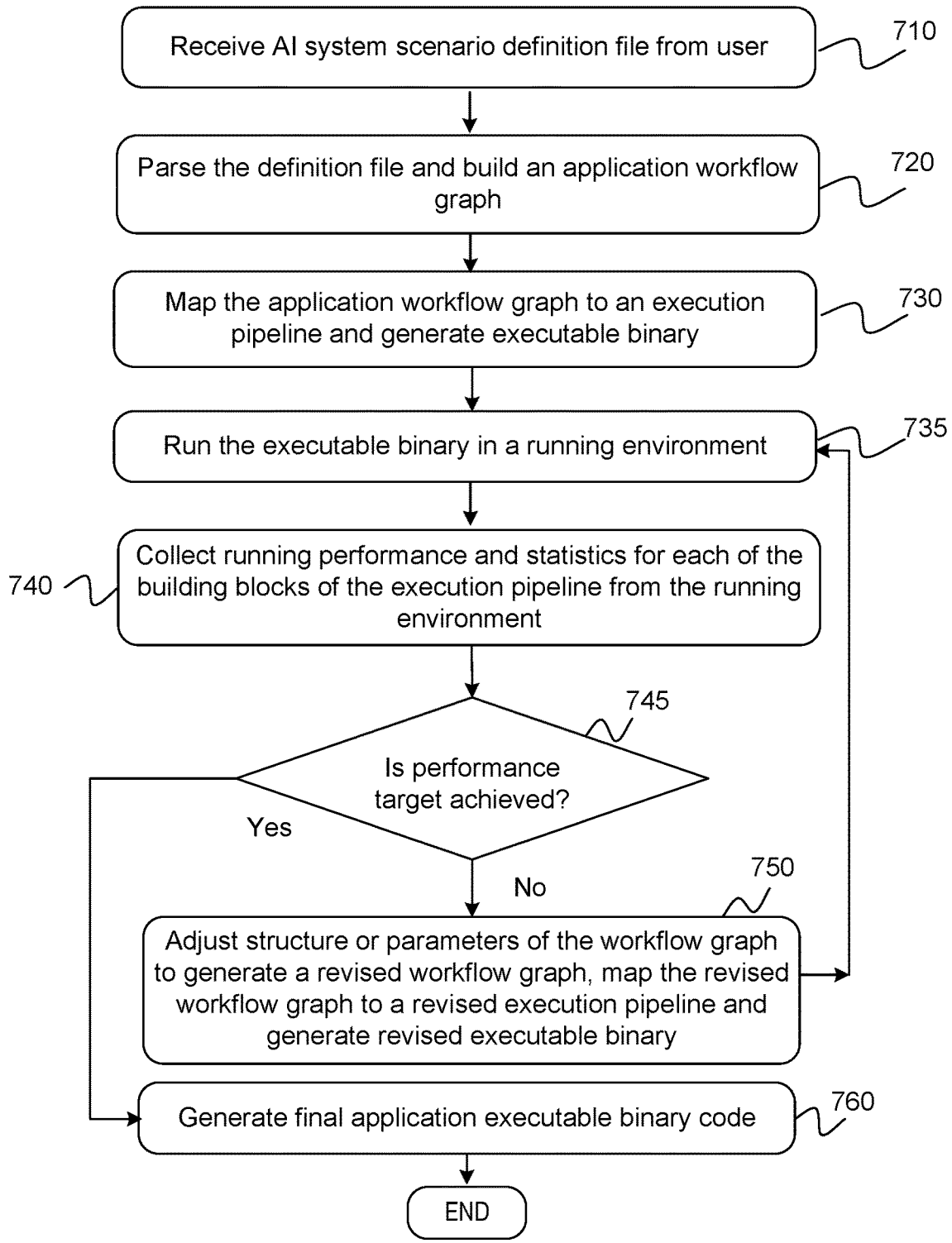
FIG. 7 depicts process flow of an example AI system workflow builder method, according to one embodiment disclosed herein.

FIG. 7 depicts process flow of an example AI system workflow builder method, according to one embodiment disclosed herein. Method 700 includes blocks 710 through 760. In alternate embodiments, method 700 may have more, or fewer, blocks. In one embodiment, method 700 may be performed, for example, by AI system workflow builder 100 of FIG. 1, or, for example, by system node 210 of FIG. 2, or, for example, by the example workflow architecture of FIGS. 3 and 4, for example.

Continuing with reference to FIG. 7, method 700 begins at block 710, where an AI system scenario definition file is received from a user or client. The AI system scenario definition file may be, for example, AI system scenario definition file 105 of FIG. 1, for example, or one similar to scenario definition 410 illustrated in FIG. 4, and described in detail above.

From block 710 method 700 proceeds to block 720, where the definition file is parsed, and an application workflow graph is built form the parsed file. This may be performed, for example, by definition parser 310 of FIG. 3.

From block 720, method 700 proceeds to query block 730, where the application workflow graph is mapped to an execution pipeline and executable binary for the example AI system is generated. For example, this may be performed by pipeline assembler 320 of FIG. 3, as described above.

From block 730, method 700 proceeds to block 735, where the executable binary code is run in a running environment, such as, for example, running environment 130 of FIG. 1, or, for example, running environment 330 of FIG. 3. From block 735, method 700 proceeds to block 740, where running performance and statistics for each of the building blocks of the execution pipeline are collected from the running environment. As an example, the running performance and statistics may be collected by profiling probe 337, shown in in FIG. 3.

From block 740, method 700 proceeds to query block 745, where it is determined if a performance target for the example executable binary code, such as, for example, is provided in the AI system scenario definition file, has been met by the executable binary as run at block 735. If the return to query block 745 is a "Yes", and thus the specified performance target was achieved, then method 700 proceeds to block 760, where final application executable binary code is generated, and method 700 then ends.

On the other hand, if the return at query block 745 is "No", and thus the specified performance target was achieved, then method 700 proceeds to block 750, where structure or parameters of the workflow graph are adjusted to generate a revised workflow graph, the revised workflow graph is then mapped to a revised execution pipeline, and a revised executable binary is generated. From block 750, method 700 then proceeds back to block 735, where blocks 735, 740 and query block 745 are performed again, in a first optimization iteration. In one embodiment, the iterations continue through blocks 735, 740 and 745 until such time as a "Yes" is returned in response to query block 745, at which point method 700 finally proceeds to block 760, where final application executable binary code is generated, and method 700 then ends.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, users may upload one or more AI system scenario definition files, via a user interface provided, for example, on a website, to a cloud based system, in accordance with one or more embodiments hereof.

For example, the AI system workflow builder application may execute on a computing system in the cloud and store both of all AI system scenario definition files sent to it by users, and all final application executable binary code generated by it, at a storage location in the cloud. Doing so allows a user to access the final application executable binary code from any computing system attached to a network connected to the cloud (e.g., the Internet), and thus facilitates a central depository of several user requested AI systems, obviating the need for any user to build their own AI system on their own. In one or more embodiments, for example, the AI system workflow builder application may also send the resulting final application executable binary code generated by it to a user system, storage device, or code repository, as described above.

While the foregoing is directed to embodiments of the present invention, other and further embodiments of the invention may be devised without departing from the basic scope thereof, and the scope thereof is determined by the claims that follow.

What is claimed is:

1. A method comprising:
   receiving a scenario definition file of an artificial intelligence (AI) system, the scenario definition file including a performance target;
   parsing, by a parser, the scenario definition file and building an application workflow graph for the AI system;
   mapping, by an assembler, the application workflow graph to an execution pipeline, the execution pipeline including one or more building blocks from a parameterized component library;
   generating, from the application workflow graph automatically, executable binary code implementing the AI system;
   evaluating, by a profiler and based on the execution pipeline and the executable binary code, a running performance associated with the application workflow graph;
   producing a plurality of modified workflow graphs by, for each modified workflow graph being produced: modifying, by an optimizer, the last-produced workflow graph based on the running performance associated therewith, wherein the mapping, generating, and evaluating are performed for the respective modified workflow graph once produced; and
   upon determining that the last-produced workflow graph meets the performance target, outputting the executable binary code of the last-produced workflow graph.

2. The method of claim 1, wherein evaluating the running performance comprises collecting performance results of each of one or more building blocks of the execution pipeline when run in a runtime environment.

3. The method of claim 2, wherein modifying the last-produced workflow graph comprises adjusting at least one of a structure or parameters of the last-produced workflow graph.

4. The method of claim 3, wherein the producing comprises recursively producing one or more Kth modified workflow graphs, where K is a positive integer>1, based on the running performance of one or more building blocks of the execution pipeline that the (K−1)th modified workflow graph maps to.

5. The method of claim 2, wherein the performance results include at least one of system performance, deep learning algorithm performance and resource utilization.

6. The method of claim 1, wherein building the application workflow graph for the AI system further comprises selecting at least one of: topology, one or more algorithms, one or more deep neural networks, and component parameters.

7. The method of claim 1, wherein parsing the scenario definition file further comprises identifying an optimization target for the AI system.

8. The method of claim 7, wherein the producing iteratively optimizes the workflow graph to achieve the optimization target.

9. The method of claim 1, wherein the (AI) system scenario definition file specifies a running environment, and wherein the executable binary code is generated for the specified running environment.

10. The computer-implemented method of claim 1, wherein the AI system is configured to detect and track physical objects based on computer vision, wherein the one or more building blocks including a video-source component, a video-codec component, a persistence-sink component, an image-transformer component, an object-detector component, a pipeline-splitter component, an object-tracker component, an attribute-extractor component, and a pipeline-collector component.

11. The computer-implemented method of claim 10, the performance target comprising object-detection accuracy, object-detection speed, object-detection throughput, and object-detection processor-utilization, wherein the scenario definition file is received via an interface, and wherein the executable binary code is generated by the assembler;
   wherein the computer-implemented method is performed by a workflow builder that includes a plurality of components, the plurality of components comprising the interface, the parser, the assembler, the profiler, and the optimizer;
   wherein the interface comprises a user interface, wherein the parser comprises a definition parser, wherein the assembler comprises a pipeline assembler, wherein the optimizer comprises a workflow optimizer, and wherein the profiler comprises a profiling probe configured to collect runtime statistics of each building block of the execution pipeline when the executable binary code is run in the runtime environment.

12. A system, comprising:
   one or more computer processors; and
   a memory containing a program executable by the one or more computer processors to perform an operation comprising:
      receiving a scenario definition file of the system, the system comprising an artificial intelligence (AI) system, the scenario definition file including a performance target;
      parsing, by a parser, the scenario definition file and build an application workflow graph for the AI system;
      mapping, by an assembler, the application workflow graph to an execution pipeline, the execution pipeline including one or more building blocks from a parameterized component library;
      generating, from the workflow graph automatically, executable binary code implementing the AI system;

evaluating, by a profiler and based on the execution pipeline and the executable binary code, a running performance associated with the application workflow graph;

producing a plurality of modified workflow graphs by, for each modified workflow graph being produced:
  modifying, by an optimizer, the last-produced workflow graph based on the running performance associated therewith, wherein the mapping, generating, and evaluating are performed for the respective modified workflow graph once produced; and
  upon determining that the last-produced workflow graph meets the performance target, outputting the executable binary code of the last-produced workflow graph.

13. The system of claim 12, wherein the executable binary code is run in a runtime environment that includes the profiler, which is configured to collect performance results for the executable binary code when run in the runtime environment.

14. The system of claim 13, the operation further comprising, by the optimizer:
  receiving the performance results; and
  adjusting a structure or parameters of the workflow graph based on the performance results.

15. The system of claim 14, wherein the optimizer is further configured to produce the plurality of modified workflow graphs by iteratively or recursively producing one or more Kth modified workflows, where K is a positive integer>1, based on a running performance of one or more building blocks of the execution pipeline that the (K−1)th modified workflow graph maps to.

16. A computer program product comprising:
  a computer-readable storage medium having computer-readable program code embodied therewith, the computer-readable program code executable by one or more computer processors to perform an operation comprising:
    receive a system scenario definition file of an artificial intelligence (AI) system, the scenario definition file including a performance target;
    parse, by a parser, the scenario definition file and building an application workflow graph for the AI system;
    map, by an assembler, the application workflow graph to an execution pipeline, the execution pipeline including one or more building blocks from a parameterized component library;
    generate, from the application workflow graph automatically, executable binary code implementing the AI system;
    evaluating, by a profiler and based on the execution pipeline and the executable binary code, a running performance associated with the application workflow graph;
    produce a plurality of modified workflow graphs by, for each modified workflow graph being produced:
      modifying, by an optimizer, the last-produced workflow graph based on the running performance associated therewith, wherein the mapping, generating, and evaluating are performed for the respective modified workflow graph once produced; and
      upon determining that the last-produced workflow graph meets the performance target, output the executable binary code of the last-produced workflow graph.

17. The computer program product of claim 16, wherein evaluating the running performance comprises collecting running performance data of each of one or more building blocks of the execution pipeline in a runtime environment.

18. The computer program product of claim 17, wherein modifying the last-produced workflow graph comprises adjusting at least one of the structure or parameters of the last-produced workflow graph.

19. The computer program product of claim 18, wherein the producing comprises iteratively producing one or more Kth modified workflow graphs, where K is a positive integer>1, based on a running performance of the one or more building blocks of the execution pipeline that the (K−1)th modified workflow graph maps to.

20. The computer program product of claim 19, wherein the scenario definition file includes a performance target, the operation further comprising:
  determine if the execution pipeline corresponding to the Kth modified workflow graph meets the performance target; and
  in response to a determination that it does, selecting, for output, the execution pipeline corresponding to the Kth modified workflow graph.

* * * * *